(12) United States Patent
Kobayashi et al.

(10) Patent No.: US 12,155,953 B2
(45) Date of Patent: Nov. 26, 2024

(54) PHOTOELECTRIC CONVERSION APPARATUS AND EQUIPMENT

(71) Applicant: CANON KABUSHIKI KAISHA, Tokyo (JP)

(72) Inventors: Hideo Kobayashi, Tokyo (JP); So Hasegawa, Kanagawa (JP); Hajime Hayami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/971,797

(22) Filed: Oct. 24, 2022

(65) Prior Publication Data
US 2023/0179890 A1    Jun. 8, 2023

(30) Foreign Application Priority Data
Dec. 6, 2021  (JP) .................. 2021-197870

(51) Int. Cl.
*H04N 25/77*     (2023.01)
*H04N 25/767*    (2023.01)
*H04N 25/772*    (2023.01)

(52) U.S. Cl.
CPC ......... *H04N 25/772* (2023.01); *H04N 25/767* (2023.01)

(58) Field of Classification Search
CPC ............................ H04N 25/772; H04N 25/767
See application file for complete search history.

(56) References Cited

U.S. PATENT DOCUMENTS

| | | |
|---|---|---|
| 7,990,440 B2 | 8/2011 | Kobayashi |
| 8,710,558 B2 | 4/2014 | Inoue |
| 8,835,828 B2 | 9/2014 | Kobayashi |
| 8,884,391 B2 | 11/2014 | Fudaba |
| 8,922,668 B2 | 12/2014 | Ota |
| 9,264,641 B2 | 2/2016 | Kobayashi |
| 9,305,954 B2 | 4/2016 | Kato |

(Continued)

FOREIGN PATENT DOCUMENTS

| | | |
|---|---|---|
| JP | 2011-041091 A | 2/2011 |
| JP | 2019-068318 A | 4/2019 |

OTHER PUBLICATIONS

U.S. Appl. No. 17/960,247, filed Oct. 5, 2022, Named Inventors: Hideo Kobayashi, et al.

(Continued)

*Primary Examiner* — Twyler L Haskins
*Assistant Examiner* — Fayez A Bhuiyan
(74) *Attorney, Agent, or Firm* — Venable LLP

(57) ABSTRACT

A photoelectric conversion apparatus comprising: pixels; processors; and a controller. Each of the processors comprise a first column circuit and a second column circuit, each of which perform A/D conversion of converting, into a digital signal, one pixel signal output from the pixel arranged in a corresponding column of the plurality of columns. The controller comprises a generator configured to generate a first signal used in the A/D conversion, and a second signal different from the first signal and used in the A/D conversion. The apparatus further comprises a selector configured to receive the first signal and the second signal, and select and supply one of the first signal and the second signal to the second column circuit in a period in which the first signal is supplied to the first column circuit.

16 Claims, 15 Drawing Sheets

(56) References Cited

U.S. PATENT DOCUMENTS

| | | |
|---|---|---|
| 9,357,122 B2 | 5/2016 | Kususaki |
| 9,407,847 B2 | 8/2016 | Maehashi |
| 9,438,828 B2 | 9/2016 | Itano |
| 9,509,931 B2 | 11/2016 | Kobayashi |
| 9,602,752 B2 | 3/2017 | Kobayashi |
| 10,015,430 B2 | 7/2018 | Kobayashi |
| 10,609,316 B2 | 3/2020 | Kobayashi |
| 10,841,517 B2 | 11/2020 | Totsuka |
| 11,268,851 B2 | 3/2022 | Kobayashi |
| 11,431,929 B2 | 8/2022 | Kobayashi |
| 11,463,644 B2 | 10/2022 | Soda |
| 11,470,275 B2 | 10/2022 | Kobayashi |
| 11,496,704 B2 | 11/2022 | Sato |
| 2008/0284626 A1* | 11/2008 | Hattori .................. H03M 1/129 341/172 |
| 2011/0037868 A1 | 2/2011 | Ota |
| 2012/0175503 A1 | 7/2012 | Kuroda |
| 2013/0140440 A1 | 6/2013 | Kobayashi |
| 2016/0227141 A1 | 8/2016 | Kobayashi |
| 2019/0104264 A1 | 4/2019 | Totsuka |
| 2021/0021770 A1 | 1/2021 | Nakazawa |
| 2021/0289195 A1* | 9/2021 | Iwane .................. H04N 25/701 |
| 2021/0360180 A1 | 11/2021 | Saito |
| 2022/0030164 A1 | 1/2022 | Kobayashi |
| 2022/0247964 A1 | 8/2022 | Kobayashi |
| 2022/0272295 A1 | 8/2022 | Kobayashi |
| 2022/0302199 A1 | 9/2022 | Kobayashi |
| 2022/0303484 A1 | 9/2022 | Kobayashi |
| 2022/0303485 A1 | 9/2022 | Kobayashi |
| 2022/0303486 A1 | 9/2022 | Kobayashi |

OTHER PUBLICATIONS

U.S. Appl. No. 17/963,289, filed Oct. 11, 2022, Named Inventor: Hideo Kobayashi.

U.S. Appl. No. 17/981,657, filed Nov. 7, 2022, Named Inventors: Hideo Kobayashi, et al.

U.S. Appl. No. 17/900,971, filed Sep. 1, 2022, Named Inventors: Hideo Kobayashi, et al.

U.S. Appl. No. 17/939,225, filed Sep. 7, 2022, Named Inventor: Hideo Kobayashi.

U.S. Appl. No. 18/074,642, filed Dec. 5, 2022, Named Inventors: Kazuo Yamazaki, et al.

U.S. Appl. No. 18/068,622, filed Dec. 20, 2022, Named Inventors: Hideo Kobayashi, et al.

U.S. Appl. No. 17/704,046, filed Mar. 25, 2022, Named Inventors: Hideo Kobayashi, et al.

U.S. Appl. No. 17/816,097, filed Jul. 29, 2022, Named Inventor: Hideo Kobayashi.

* cited by examiner

PHOTOELECTRIC CONVERSION APPARATUS AND EQUIPMENT

BACKGROUND OF THE INVENTION

Field of the Invention

The present invention relates to a photoelectric conversion apparatus and an equipment.

Description of the Related Art

Japanese Patent Laid-Open No. 2011-041091 describes a solid-state image sensor in which two comparators are connected in parallel to a signal line which reads out signals for each pixel column. By changing the reference level, which changes with time, between the two comparators and switching and using the two comparators in accordance with the signal level of the pixel signal, the degree of freedom upon using the pixel signal can be improved. For example, the A/D conversion speed can be maintained, and noise can be reduced.

In addition, Japanese Patent Laid-Open No. 2019-068318 describes an arrangement provided with a selector that selects a ramp signal to be input to a comparator. It is described that, by using this selector, different gains are applied to the pixel signal.

Some embodiments of the present invention provide a technique advantageous in further improving the degree of freedom of processing on a signal output from a pixel.

SUMMARY OF THE INVENTION

According to some embodiments, a photoelectric conversion apparatus comprising: a plurality of pixels arranged so as to form a plurality of rows and a plurality of columns; a plurality of processing circuits; and a control circuit configured to control the plurality of processing circuits, wherein each of the plurality of processing circuits comprise a first column circuit and a second column circuit, each of which perform A/D conversion of converting, into a digital signal, one pixel signal output from the pixel arranged in a corresponding column of the plurality of columns, the control circuit comprises a generation circuit configured to generate a first signal used in the A/D conversion, and a second signal different from the first signal and used in the A/D conversion, and the apparatus further comprises a selection circuit configured to receive the first signal and the second signal, and select and supply one of the first signal and the second signal to the second column circuit in a period in which the first signal is supplied to the first column circuit, is provided.

Further features of the present invention will become apparent from the following description of exemplary embodiments (with reference to the attached drawings).

DESCRIPTION OF THE EMBODIMENTS

Figure 1:
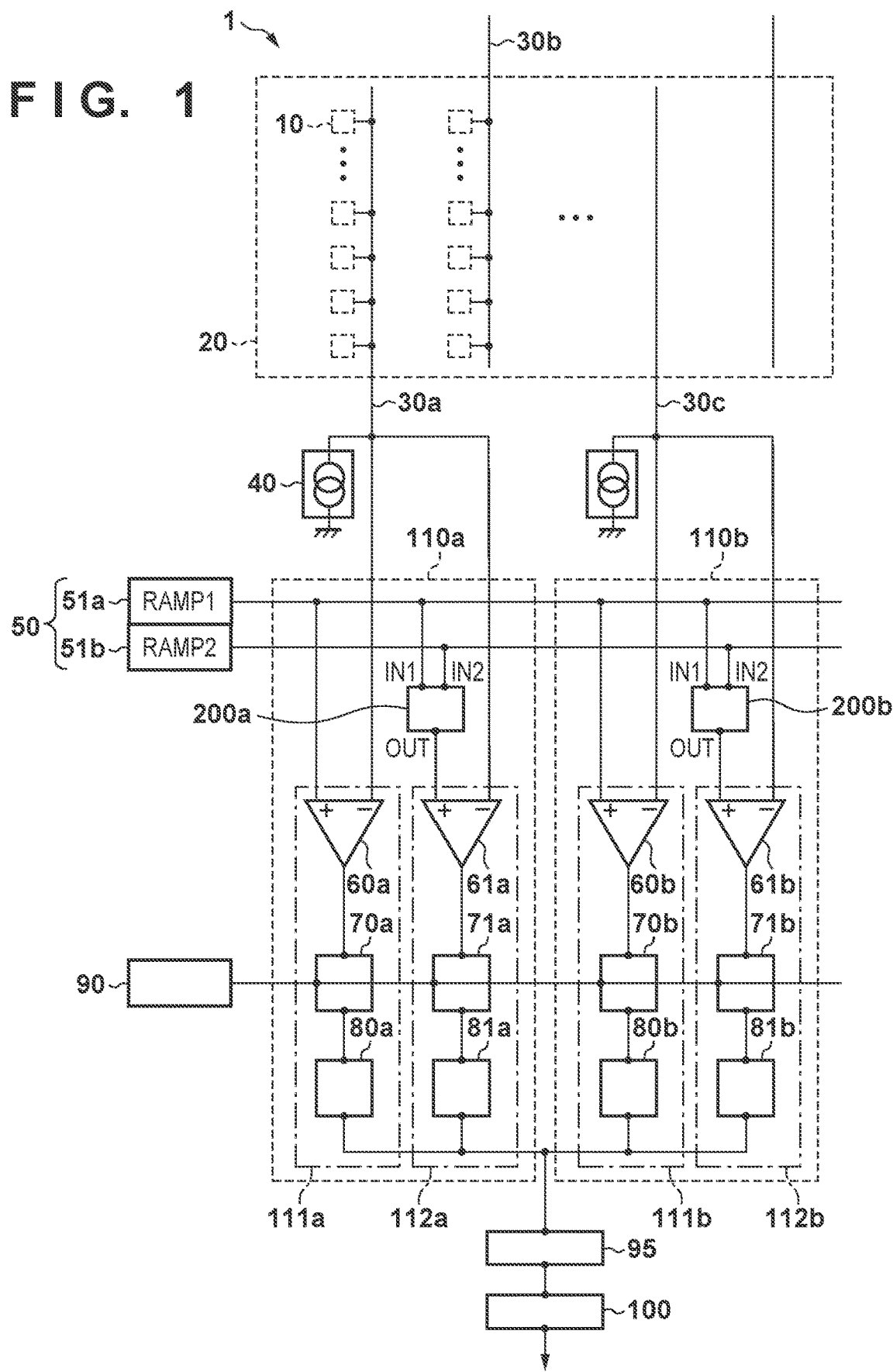
FIG. 1 is a view showing an arrangement example of a photoelectric conversion apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

With reference to FIGS. 1 to 15, a photoelectric conversion apparatus according to an embodiment of the present disclosure will be described. In the embodiment described below, an image capturing apparatus will be mainly described as an example of the photoelectric conversion apparatus. However, each embodiment is not limited to the image capturing apparatus, and is also applicable to other examples of the photoelectric conversion apparatus. Examples of the photoelectric conversion apparatus are a distance measurement apparatus (a apparatus for focus detection, distance measurement using TOF (Time Of Flight), or the like) and a light measurement apparatus (a apparatus for measuring the incident light amount or the like).

FIG. 1 is a view showing an arrangement example of a photoelectric conversion apparatus 1 according to this embodiment. The photoelectric conversion apparatus 1 includes a pixel array 20 in which a plurality of pixels 10 are arranged so as to form a plurality of rows and a plurality of columns, a plurality of processing circuits 110 respectively corresponding to the plurality of columns, and a control circuit 50 for controlling the plurality of processing circuits 110. Here, as shown in FIG. 1, when indicating a specific processing circuit of the plurality of processing circuits 110, a suffix is added to each reference numeral, like a processing circuit 110"*a*". If the processing circuits need not be discriminated, they are expressed simply as "processing circuit 110". This also applies to other components.

A pixel signal output from the pixel 10 is input to the processing circuit 110 corresponding to one signal line 30 via the signal line 30 connected to the pixels 10 arranged in the corresponding column of the plurality of columns. Each signal line 30 is connected to a current source 40. The pixel signals processed by the plurality of processing circuits 110 are output from an output circuit 100 to the outside of the photoelectric conversion apparatus 1 (chip) via a processing unit 95.

Each of the plurality of processing circuits 110 includes a column circuit 111 and a column circuit 112 that process the pixel signal output from the pixel 10 arranged in the corresponding column of the plurality of columns. More specifically, each of the column circuit 111 and the column circuit 112 performs A/D conversion of converting one pixel signal output from the pixel 10 arranged in the corresponding column into a digital signal. In the arrangement shown in FIG. 1, the column circuit 111 includes a comparator 60, a memory 70, and a memory 80, and the column circuit 112 includes a comparator 61, a memory 71, and a memory 81. A counter 90 is connected to the memories 70 and 71.

The control circuit 50 includes generation circuits 51a and 51b which generate a first signal used in the A/D conversion, and a second signal different from the first signal and used in the A/D conversion, respectively. The control circuit 50 includes the generation circuit 51a that generates the first signal for controlling the signal processing (A/D conversion) in the column circuit 111 and the column circuit 112, and the generation circuit 51b that generates the second signal (for controlling the signal processing (A/D conversion) in the column circuit 111 and the column circuit 112) different from the first signal. In the arrangement shown in FIG. 1, the control circuit 50 includes the generation circuit 51a that generates the first signal, and the control circuit 51b that generates the second signal, but the present invention is not limited to this. The control circuit 50 may include one generation circuit 51, and the generation circuit 51 may generate the first signal and the second signal.

The photoelectric conversion apparatus 1 includes a selection circuit 200 that receives the first signal and the second signal, and selects and supplies one of the first signal and the second signal to the column circuit 112 in a period in which the first signal is supplied to the column circuit 111. In this embodiment, the selection circuit 200 arranged to selectively supply the first signal or the second signal to the column circuit 112 is each of a plurality of multiplexers provided so as to correspond to each of the plurality of processing circuits 110.

Figure 2:
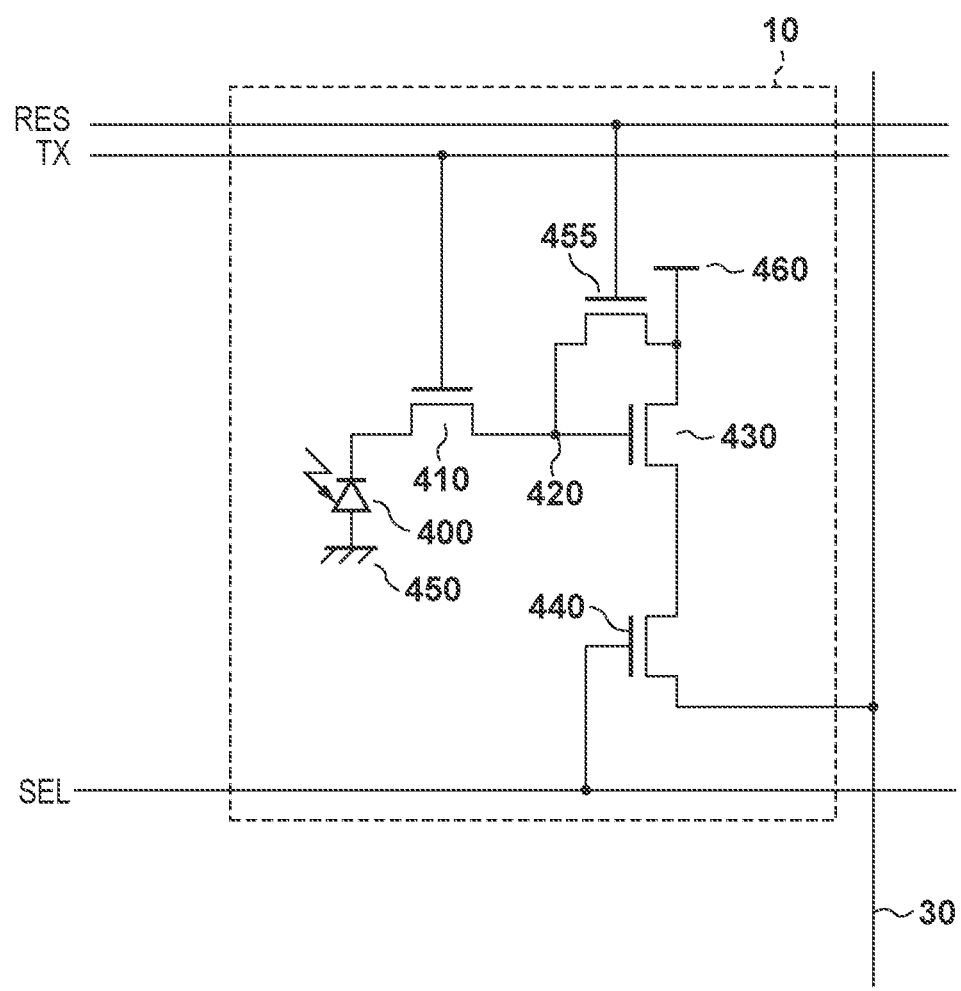
FIG. 2 is a view showing an arrangement example of a pixel of the photoelectric conversion apparatus shown in FIG. 1.

FIG. 2 shows an example of the circuit arrangement of one pixel 10. The pixel 10 includes a photodiode 400 as a photoelectric conversion element, a transfer transistor 410, a source follower transistor 430, a selection transistor 440, and a reset transistor 455. The reset transistor 455 resets the potential of a node 420 serving as a floating diffusion. When the transfer transistor 410 is turned on, electric charges generated in the photodiode 400 are transferred to the node 420. The electric charges transferred to the node 420 are converted into a signal voltage by the parasitic capacitance associated with the node 420. The signal voltage is output to the signal line 30 as a pixel signal via the source follower transistor 430 and the selection transistor 440. The source follower transistor 430 forms a source follower together with the current source 40 shown in FIG. 1, and the signal voltage on the node 420 is buffered by the source follower and output to the signal line 30.

In the arrangement shown in FIG. 1, the first signal and the second signal are ramp waves RAMP1 and RAMP2, respectively, having slopes different from each other. A comparator 60a compares the pixel signal output to a signal line 30a with the ramp wave RAMP1 output from the generation circuit 51a. A comparator 60b compares the pixel signal output to a signal line 30c with the ramp wave RAMP1 output from the generation circuit 51a. Memories 70a and 70b capture the count signal of the counter 90 at the timings at which outputs of the comparators 60a and 60b are inverted, respectively. Memories 71a and 71b capture the count signal of the counter 90 at the timings at which outputs of comparators 61a and 61b are inverted, respectively. Thus, the pixel signal output from the pixel 10 is A/D-converted. The digital signals captured in the memories 70 and 71 are transferred to the memories 80 and 81, and then undergo signal processing by the processing unit 95 and output to the outside of the chip via the output circuit 100.

Here, this embodiment shows an example in which the common counter 90 is used by the plurality of processing circuits 110. However, an arrangement may be employed in which a common count clock is supplied, and a counter is arranged for each processing circuit 110 corresponding to each signal line 30. This embodiment is also applicable to this arrangement. In this case, a plurality of the counters 90 are arranged in correspondence with the memories 70 and 71. In FIG. 1, the circuit connected to a signal line 30b, which is connected to the pixels 10 in an even-numbered column of the pixel array 20, is not shown because it may have an arrangement similar to that of the circuit connected to the signal line 30a.

Figure 3:
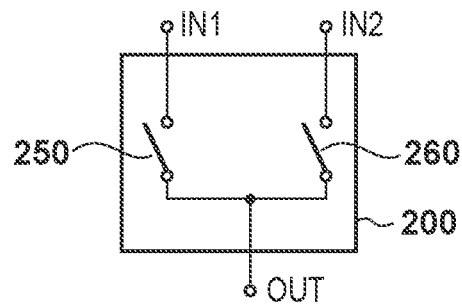
FIG. 3 is a circuit diagram showing an arrangement example of a multiplexer of the photoelectric conversion apparatus shown in FIG. 1.

An arrangement example of the multiplexer used as the selection circuit 200 is shown in FIG. 3. Each multiplexer (selection circuit 200) includes input terminals IN1 and IN2 that receive the first signal and the second signal, respectively, and an output terminal OUT that supplies the first signal or the second signal to the corresponding column circuit 112. The multiplexer (selection circuit 200) includes a switch element 250 and a switch element 260 to supply the first signal or the second signal to the column circuit 112. In this embodiment, the multiplexer arranged as the selection circuit 200 enables various readout methods of the pixel signals from the pixel array 20. Three types of readout methods will be described below with reference to FIGS. 4 to 7.

Figure 4:
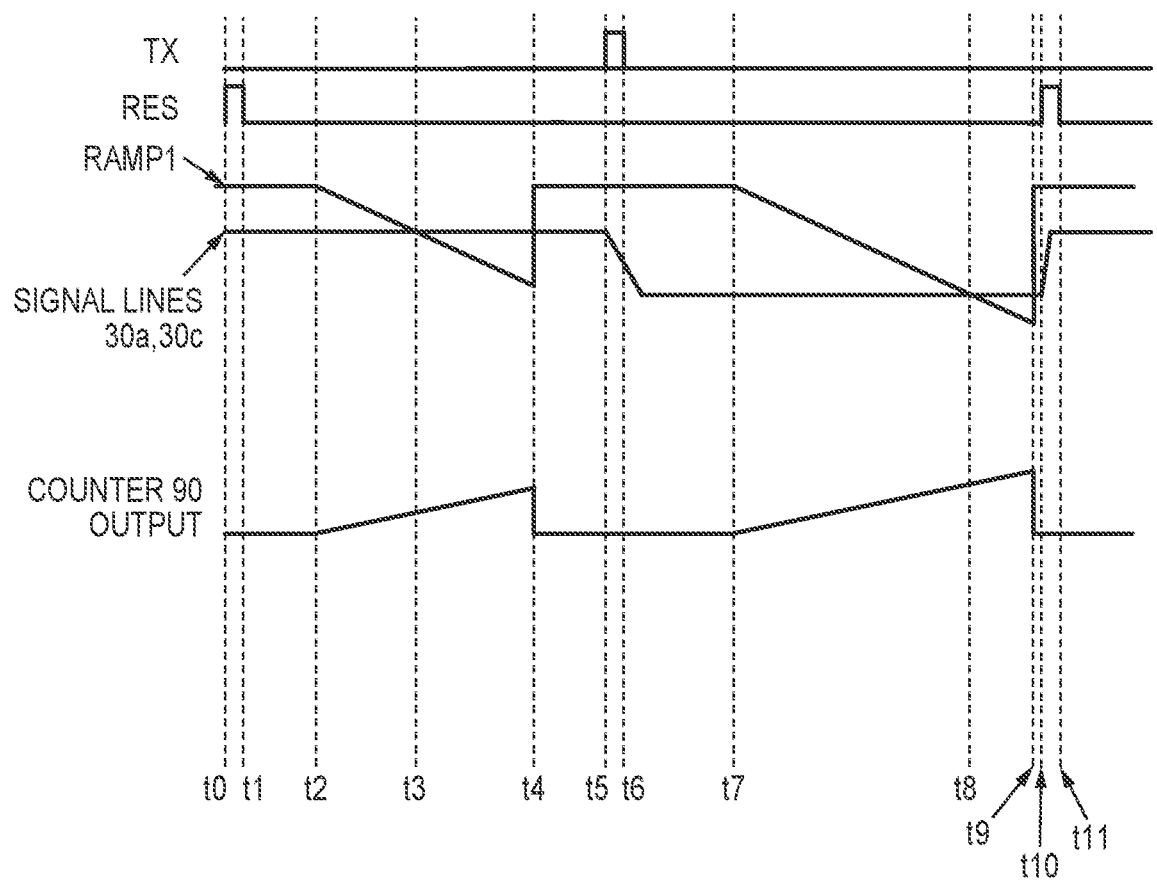
FIG. 4 is a timing chart showing an operation example of the photoelectric conversion apparatus shown in FIG. 1.

First, with reference to the timing chart of FIG. 4, an operation will be described in which the pixel signal output from the pixel 10 to the signal line 30 is A/D-converted in the comparator 60 and the comparator 61 by the same gain. In this case, the selection circuit 200 supplies, to the comparator 61 of the processing circuit 110, the ramp wave RAMP1 output as the first signal from the generation circuit 51a of the control circuit 50. For example, when the switch element 250 of the multiplexer (selection circuit 200) shown in FIG. 3 is turned on and the switch element 260 is turned off, the ramp wave RAMP1 is supplied from the generation circuit 51a to the comparator 61. At this time, the generation circuit 51b of the control circuit 50 may be in an OFF state.

In a period from time t0 to time t1, a control signal RES shown in FIG. 2 is set at high level to turn on the reset transistor 455, and the node 420 is reset. In accordance with the reset of the node 420, the potential of each of the signal lines 30a and 30c is set at the reset level. At time t1, the control signal RES is set at low level to turn off the reset transistor 455. Then, at time t2, the generation circuit 51a starts to generate the ramp wave RAMP1. Further, at time t2, the counter 90 starts to count up the count signal output.

At time t3, the outputs of the comparators 60 and 61 are inverted since the ramp wave RAMP1 input to the comparators 60 and 61 and the pixel signal output to each of the signal lines 30a and 30c from the pixels 10 become equal to each other. The counter 90 measures the times required for the outputs of the comparators 60 and 61 to be inverted, and the times are held in the memories 70 and 71, respectively. Thus, the A/D conversion at the reset level is performed. The results of the A/D conversion are transmitted to the memories 80 and 81, and then transmitted to the processing unit 95. At time t4, the ramp wave RAMP1 generated by the generation circuit 51a is reset.

In a period from time t5 to time t6, a control signal TX shown in FIG. 2 is set at high level to turn on the transfer transistor 410, and electric charges corresponding to the light entering the photodiode 400 are transferred from the photodiode 400 to the node 420. The potential of the node 420 decreases in accordance with the amount of electric charges. Accordingly, the potential of each of the signal lines 30a and 30c decreases. From time t7, the generation circuit 51a starts to generate the ramp wave RAMP1 again. At time t8, the outputs of the comparators 60 and 61 are inverted. The counter 90 measures the times required for the outputs of the comparators 60 and 61 to be inverted, and the times are held in the memories 70 and 71, respectively. Thus, the A/D conversion at the optical signal level is performed. The results of the A/D conversion are transmitted to the memories 80 and 81, and then transmitted to the processing unit 95. In the processing unit 95, the difference between the result of the A/D conversion at the optical signal level and the result of the A/D conversion at the reset level may be taken to perform so-called digital CDS (Correlated Double Sampling) processing. Further, noise can be reduced by averaging the data acquired from the memory 70a and the data acquired from the memory 71a, and averaging the data acquired from the memory 70b and the data acquired from the memory 71b. In addition, by turning off the generation circuit 51b, the power consumption in the photoelectric conversion apparatus 1 can be reduced.

Figure 5:
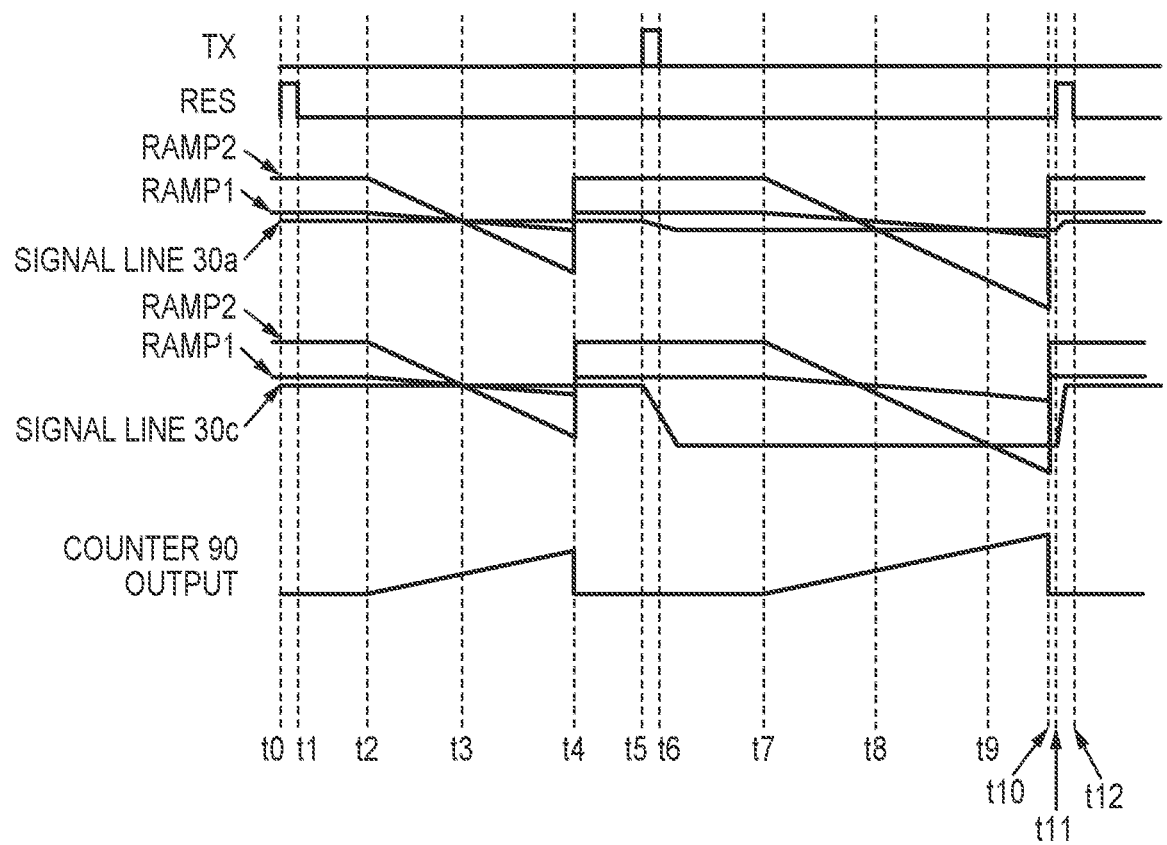
FIG. 5 is a timing chart showing an operation example of the photoelectric conversion apparatus shown in FIG. 1.

Next, with reference to FIG. 5, an operation will be described in which the signal output from the pixel to the signal line 30 is A/D-converted in the two comparators 60 and 61 by different gains. In this case, the selection circuit 200 supplies, to the comparator 61 of the processing circuit 110, the ramp wave RAMP2 output as the second signal from the generation circuit 51b of the control circuit 50. For example, when the switch element 260 of the multiplexer (selection circuit 200) shown in FIG. 3 is turned on and the switch element 250 is turned off, the ramp wave RAMP2 is supplied from the generation circuit 51b to the comparator 61.

Parts different from the above-described case shown FIG. 4 will be mainly described below. As shown in FIG. 5, the slope of the ramp wave RAMP1, which changes with time, is smaller than the slope of the ramp wave RAMP2. With this, it is possible to perform A/D conversion by different gains in the comparator 60 and the comparator 61. At time t3, the output of the comparator 60 is inverted since the ramp wave RAMP1 input to the comparator 60 and the pixel signal at the reset level of each of the signal lines 30a and 30c become equal to each other. In addition, the output of the comparator 61 is inverted since the ramp wave RAMP2 input to the comparator 61 and the pixel signal at the reset level of each of the signal lines 30a and 30c become equal to each other. The counter 90 measures the times required for the outputs of the comparators 60 and 61 to be inverted, and the times are held in the memories 70 and 71, respectively.

Thus, the A/D conversion at the reset level is performed. The results of the A/D conversion are transmitted to the memories 80 and 81, and then transmitted to the processing unit 95.

In a period from time t5 to time t6, the control signal TX shown in FIG. 2 is set at high level to turn on the transfer transistor 410, and electric charges corresponding to the light entering the photodiode 400 are transferred from the photodiode 400 to the node 420. The potential of the node 420 decreases in accordance with the amount of electric charges. Accordingly, the potential of each of the signal lines 30a and 30c decreases. Here, a case will be taken as an example and described, in which the pixel signal output from the pixel 10 connected to the signal line 30a has the smaller signal amplitude and lower luminance than the pixel signal output from the pixel 10 connected to the signal line 30c.

At time t8, the output of the comparator 61a is inverted since the ramp wave RAMP2 input to the comparator 61a and the pixel signal at the optical signal level of the signal line 30a become equal to each other. In addition, at time t9, the output of the comparator 60a is inverted since the ramp wave RAMP1 input to the comparator 60a and the pixel signal of the signal line 30a become equal to each other. Further, the output of the comparator 61b is inverted since the ramp wave RAMP2 input to the comparator 61b and the pixel signal at the optical signal level of the signal line 30c become equal to each other. The counter 90 measures the times required for the outputs of the comparators 60 and 61 to be inverted, and the times are held in the memories 70 and 71, respectively. Thus, the A/D conversion at the optical signal level is performed. On the other hand, even at time t10, the ramp wave RAMP1 input to the comparator 60b and the pixel signal of the signal line 30c do not become equal to each other, so the output of the comparator 60b is not inverted.

Accordingly, the memory 70b remains in a state of, for example, holding a value "0". The results of the A/D conversion are transmitted to the memories 80 and 81, and then transmitted to the processing unit 95. Then, in the processing unit 95, the difference between the result of the A/D conversion at the optical signal level and the result of the A/D conversion at the reset level may be taken to perform so-called digital CDS processing. A high gain A/D-converted signal of the pixel signal output to the signal line 30a is obtained from the memory 70a, and a low gain A/D-converted signal of the pixel signal output to the signal line 30a is obtained from the memory 71a. In addition, a low gain A/D-converted signal of the pixel signal output to the signal line 30c is obtained from the memory 71b. On the other hand, the signal in the memory 70b is considered invalid since the result of the A/D conversion of the pixel signal at the optical signal level is "0". Therefore, this signal is not used for subsequent signal processing.

Figure 6:
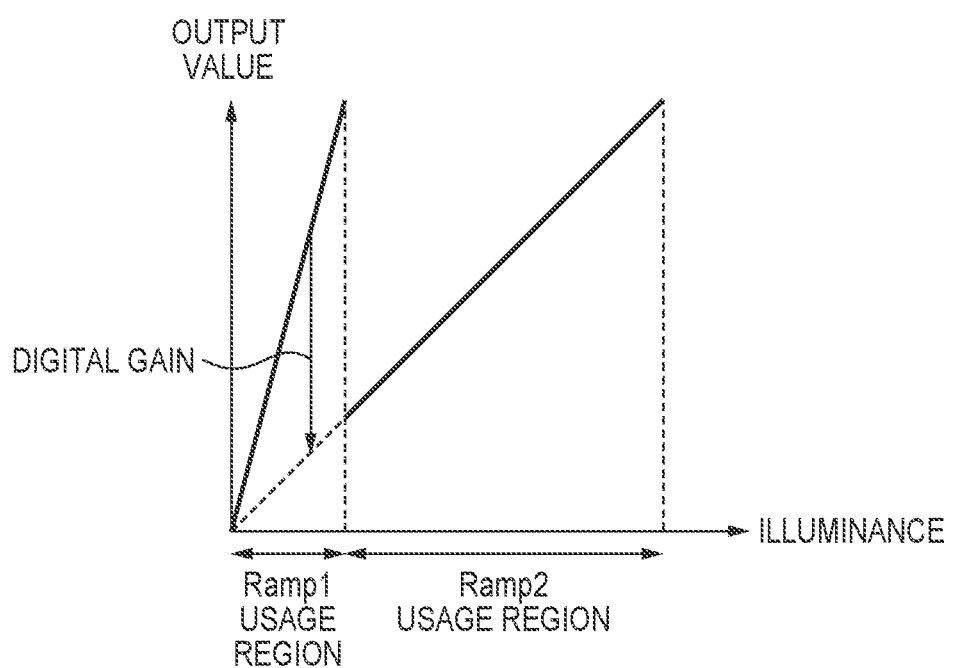
FIG. 6 is a view for explaining the operation of the photoelectric conversion apparatus shown in FIG. 1.

An example will be described below in which signal processing is further performed in the processing unit 95. As has been described above, for the low-luminance pixel signal supplied to the signal line 30a, both the low gain A/D-converted signal and the high gain A/D-converted signal are obtained. On the other hand, for the high-luminance pixel signal supplied to the signal line 30c, only the low gain A/D-converted signal is obtained. For the low-luminance pixel signal, using the high gain A/D-converted signal suppresses input conversion noise. Hence, the high gain A/D-converted signal may be used. On the other hand, for the high-luminance pixel signal, since the low gain A/D-converted signal alone is obtained, the A/D-converted signal obtained in the column circuit 112b is used. FIG. 6 shows the relationship between the illuminance and the output in this case.

It can be seen that the gain changes between the low-luminance side where the high gain A/D-converted signal using the ramp wave RAMP1 is used and the high-luminance side where the low gain A/D-converted signal using the ramp wave RAMP2 is used. In this case, in the processing unit 95, processing of decreasing the gain by a digital gain on the low-luminance side where the high gain A/D-converted signal using the ramp wave RAMP1 is used may be performed to align the gains and combine the two signals. On the low-luminance side, since both the low gain A/D-converted signal and the high gain A/D-converted signal are obtained as described above, processing using the both signals may be performed for the illuminance near the boundary portion. That is, the high gain A/D-converted signal may be used for the low luminance, the low gain A/D-converted signal and the high gain A/D-converted signal may be used for the intermediate luminance, and the low gain A/D-converted signal may be used for the high luminance. With this, an effect of suppressing a linearity error near the boundary portion between the high luminance and the low luminance can be obtained.

Figure 7:
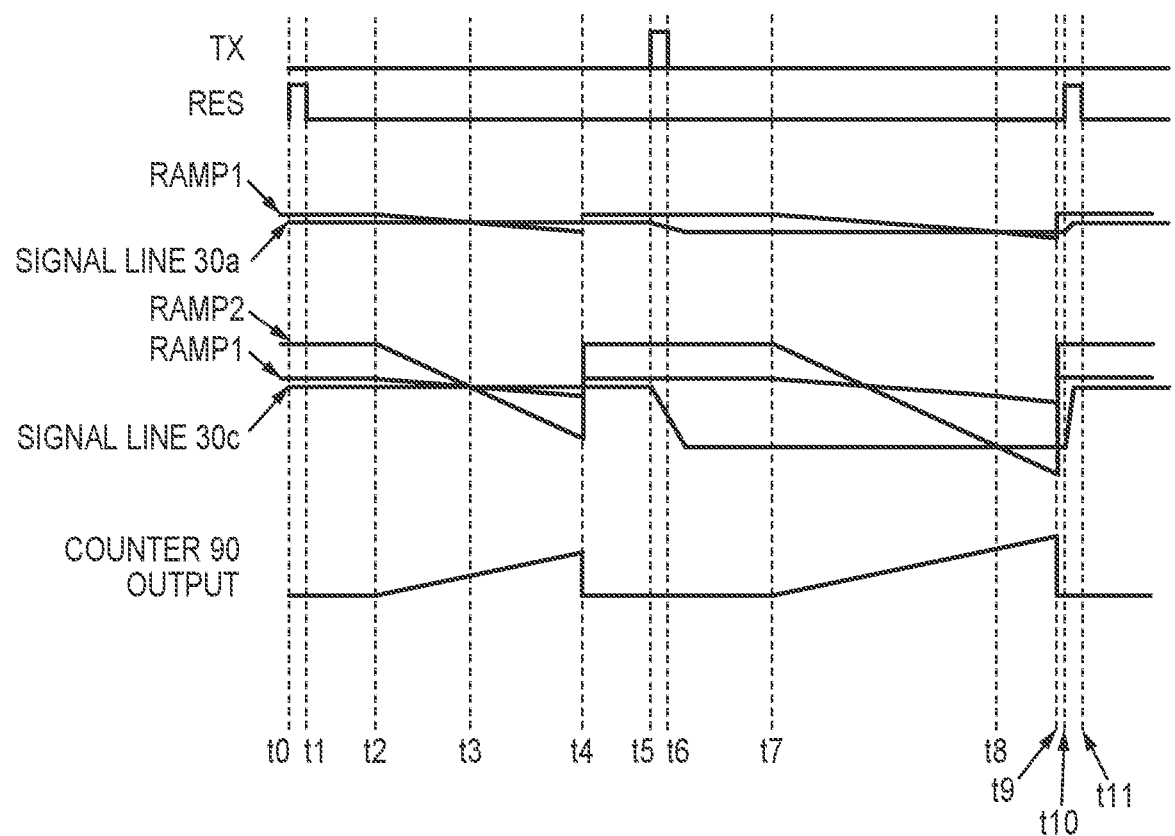
FIG. 7 is a timing chart showing an operation example of the photoelectric conversion apparatus shown in FIG. 1.

As has been described above, since the high gain A/D-converted signal is used for the low luminance, the low gain A/D-converted signal is wasted. Therefore, as shown in FIG. 7, the pixel signal supplied to the signal line 30c may be A/D-converted at the low gain and the high gain, but the low-luminance pixel signal supplied to the signal line 30a may be A/D-converted at the high gain in both the comparators 60a and 61a by supplying the ramp wave RAMP1 to both the comparators 60a and 61a of the column circuits 111a and 112a. That is, the operation of the selection circuit 200 may be changed for each column. With this, noise can be further reduced by averaging two high gain A/D-converted signals obtained from the signal line 30a. In this case, as shown in FIG. 7, only the ramp wave RAMP1 is used in the A/D conversion of the pixel signal supplied to the signal line 30a.

For example, in a case in which the sensitivity of the pixel 10 connected to the signal line 30a is low so that signals corresponding to the low luminance are constantly output from the signal line 30a, the operation as shown in FIG. 7 may be performed. Further, for example, the photoelectric conversion apparatus 1 may include a circuit that monitors the signal amplitude of the signal line 30, and the operation of the selection circuit 200 may be changed for each signal line 30 in accordance with the amplitude of the pixel signal supplied from the pixel 10 to the signal line 30. In this case, for example, when performing A/D conversion of the pixel signal at the reset level, A/D conversion by the high gain can be performed in the two comparators 60 and 61, and when performing A/D conversion of the pixel signal at the optical signal level, A/D conversion by a suitable gain can be performed in accordance with the luminance of the light entering the pixel 10.

As has been described above, when performing A/D conversion of the pixel signal supplied to the signal line 30 using the two comparators 60 and 61 by the same gain, one of the generation circuits 51a and 51b, which generate ramp waves, can be turned off. Thus, a power-saving readout operation can be performed. In addition, it is possible to A/D-convert the pixel signal supplied to the signal line 30 by different gains using the two comparators 60 and 61. Further, for example, it is possible to perform an operation in which the pixel signal supplied to the signal line 30a is A/D-converted using the comparators 60a and 61a by the same gain, and the pixel signal supplied to the signal line 30c is A/D-converted using the comparators 60b and 61b by different gains. In this manner, the photoelectric conversion apparatus 1 can support various readout methods, so that the degree of freedom of processing on the signals output from the pixels 10 can be increased.

Figure 8:
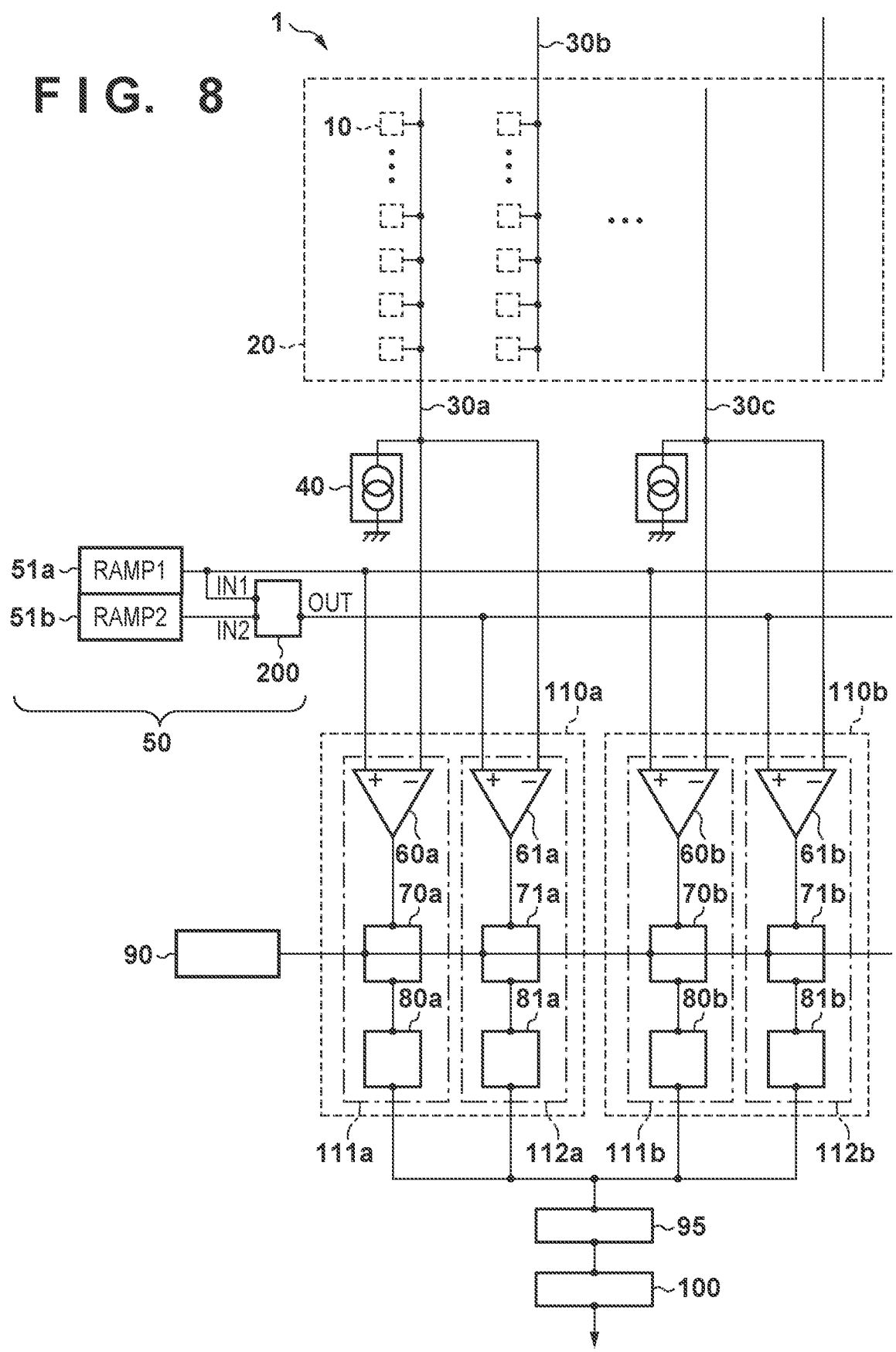
FIG. 8 is a view showing a modification of the photoelectric conversion apparatus shown in FIG. 1.

In the arrangement shown in FIG. 1, the plurality of selection circuits 200 are arranged in correspondence with the plurality of processing circuits 110, but the present invention is not limited to this. As shown in FIG. 8, the selection circuit 200 may be arranged between the generation circuits 51a and 51b and the column circuits 111 and 112. That is, the control circuit 50 may include, for example, a multiplexer as the selection circuit 200. The selection circuit 200 includes input terminals that receive the first signal (ramp wave RAMP1) and the second signal (ramp wave RAMP2), respectively, and an output terminal that supplies the first signal or the second signal to the plurality of column circuits 112 arranged in the plurality of processing circuits 110. However, the arrangement shown in FIG. 8 cannot perform the method, among the three types of readout methods described above, of changing the operation of the selection circuit 200 for each column as described with reference to FIG. 7. Further, in the arrangement shown in FIG. 8, since the on-resistance of each of the switch elements 250 and 260 in the selection circuit 200 serve as the common impedance component for the comparators 60 and 61, it can cause interference between the comparators 60 and 61. Hence, as the arrangement of the selection circuit 200, the arrangement shown in the FIG. 1 is more suitable than the arrangement shown in FIG. 8 in terms of the degree of freedom and the circuit operation.

Figure 9:
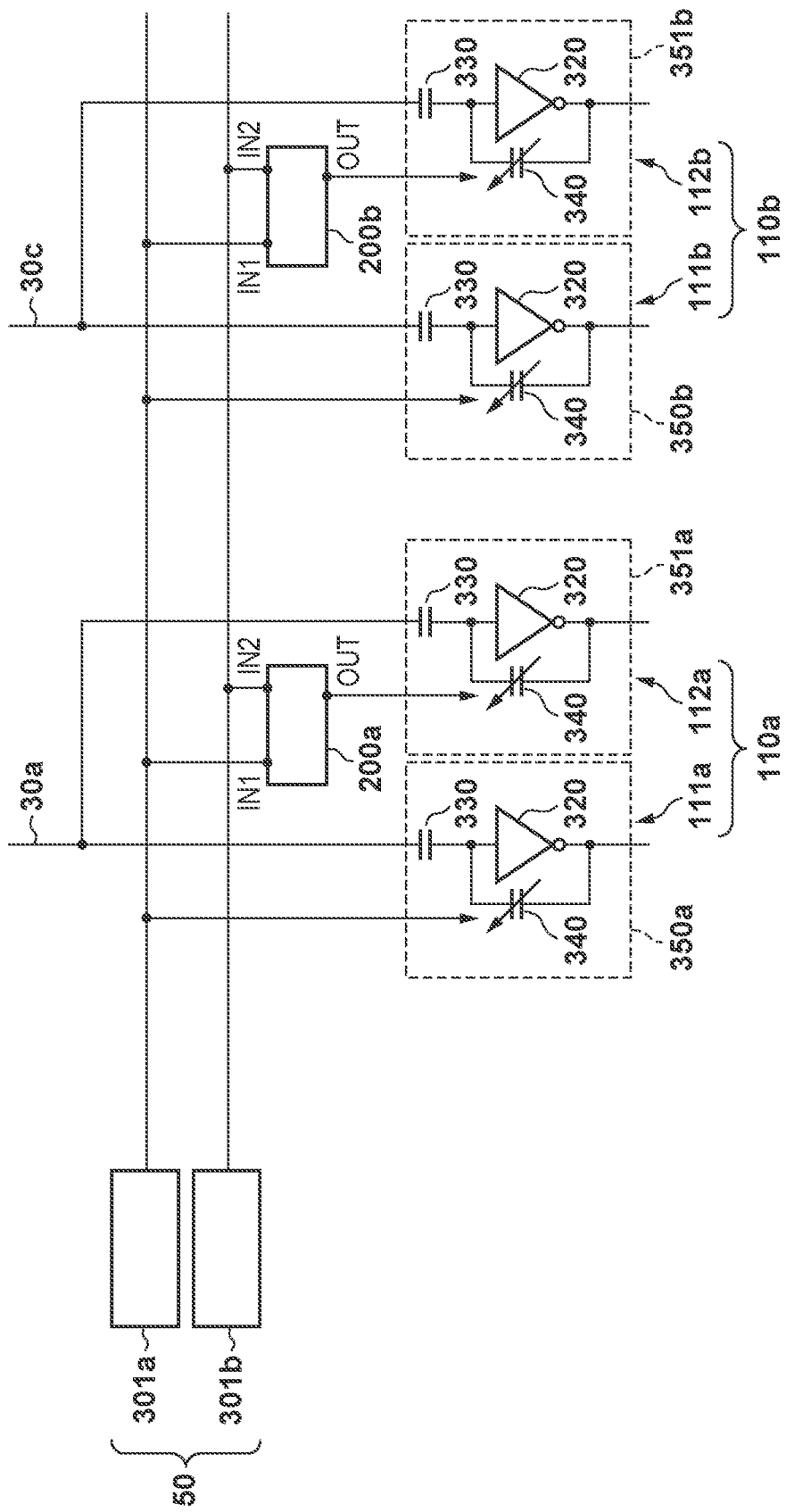
FIG. 9 is a view showing a modification of the photoelectric conversion apparatus shown in FIG. 1.

In the arrangement shown in FIG. 1, the gain control of the A/D conversion in the comparators 60 and 61 is taken as an example to describe the improvement of the degree of freedom of processing on the signals output from the pixels, but the present invention is not limited to this. As shown in FIG. 9, using a variable gain amplifier can also increase the number of various readout methods of the pixel signals from the pixels 10.

In the arrangement shown in FIG. 9, the control circuit 50 includes gain control circuits 301a and 301b. The column circuits 111 and 112, which process a pixel signal output from the pixel 10 arranged in the corresponding column, of each of the plurality of processing circuits 110 include a variable gain amplifier 350 and a variable gain amplifier 351, respectively. Each of the variable gain amplifiers 350 and 351 can include an inverting amplifier 320, an input capacitance 330, and a feedback capacitance 340. The variable gain amplifiers 350 and 351 amplify the pixel signal supplied to the signal line 30 by amplification factors different from each other in accordance with the first signal supplied from the gain control circuit 301a and the second signal supplied from the gain control circuit 301b. Also in this case, by switching the switch elements 250 and 260 between the input terminals and the output terminal of the multiplexer (selection circuit 200) as shown in FIG. 3, it is possible to perform a readout operation of the pixel signal, by the same gain, supplied to each of the signal lines 30a and 30c, a readout operation of the pixel signal, by different gains, supplied to each of the signal lines 30a and 30c, and a readout operation of the pixel signal while switching between the same gain and the different gains for each of the signal lines 30a and 30c.

Figure 10:
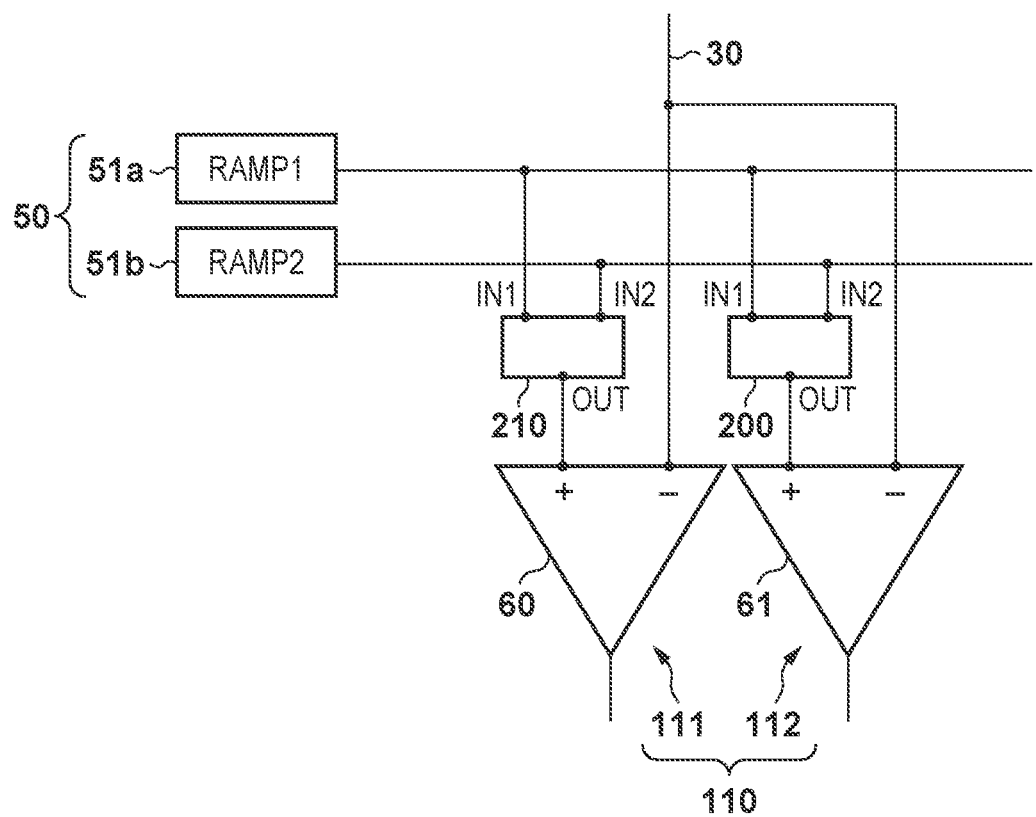
FIG. 10 is a view showing a modification of the photoelectric conversion apparatus shown in FIG. 1.

In the description with reference to FIGS. 1 to 9, it has been described that the selection circuit 200 is connected to the column circuit 112 arranged in the processing circuit 110, and the control circuit 50 selectively supplies the first signal or the second signal to the column circuit 112, but the present invention is not limited to this. An arrangement may be employed in which the first signal and the second signal are input, and one of the first signal and the second signal is selected and supplied to the column circuit 111. That is, a selection circuit 210 that supplies the first signal or the second signal to the column circuit 111 may be arranged separately from the selection circuit 200. For example, as shown in FIG. 10, the selection circuit 210 is each of a plurality of multiplexers provided so as to correspond to each of the plurality of processing circuits 110, each multiplexer including the input terminals IN1 and IN2 that receive the first signal and the second signal, respectively, and the output terminal OUT that supplies the first signal or the second signal to the corresponding column circuit 111. In FIG. 10, parts of the column circuits 111 and 112 arranged on the processing unit 95 side of the comparators 60 and 61 are not illustrated.

When the selection circuit 210 is arranged, the ramp wave RAMP2 can also be supplied to the comparator 60 from the generation circuit 51b. This enables more various readout methods of the pixel signals. In addition, when performing A/D conversion in the comparators 60 and 61 by the same gain, by supplying the first signal (ramp wave RAMP1) or the second signal (ramp wave RAMP2) to both the comparators 60 and 61 via the selection circuits 200 and 210, the impedances of the ramp waves RAMP1 and RAMP2 become substantially the same, so that the characteristic difference upon reading out the pixel signals can be reduced.

Figure 11:
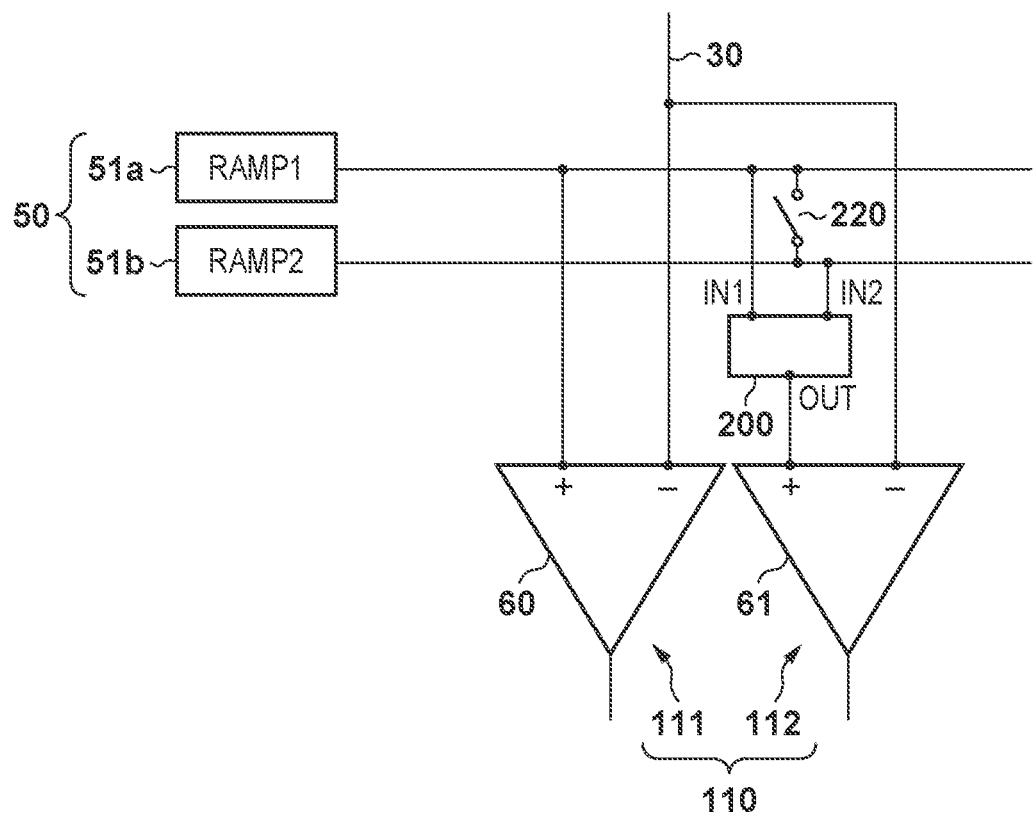
FIG. 11 is a view showing a modification of the photoelectric conversion apparatus shown in FIG. 1.

Alternatively, as shown in FIG. 11, the control circuit 50 may further include a switch element 220 that short-circuits the output of the generation circuit 51a and the output of the generation circuit 51b. With this arrangement, in a case in which ramp waves RAMP having the same slope are supplied from the generation circuit 51a and the generation circuit 51b (the same slope signal is used as the ramp wave RAMP1 and the ramp wave RAMP2), the switch element 220 is turned on to short-circuit the output of the generation circuit 51a and the output of the generation circuit 51b. With this, the ramp wave RAMP can be transmitted using two signal lines, and the impedance of the ramp signal line can be reduced.

Next, a modification of the photoelectric conversion apparatus 1 shown in FIG. 1 will be described with reference to FIG. 12. In the arrangement shown in FIG. 1, the column circuit 111 and the column circuit 112 are connected in parallel to the signal line 30 connected to the pixels 10 arranged in one corresponding column of the plurality of the columns of the pixel array 20. On the other hand, in the arrangement shown in FIG. 12, two signal lines 30 and 31 are arranged with respect to one column in which the pixels 10 are arranged. With this arrangement, in addition to the three types of readout methods described above, it is possible to simultaneously read out pixel signals of the pixels 10 in two rows. Further, since the selection circuit 200 is included, for example, when simultaneously reading out the pixel signals from the pixels 10 in two rows, it is possible to A/D convert the pixel signals using the ramp wave RAMP1 generated by the single generation circuit 51a. With this, it can be suppressed that a characteristic difference is generated between the two rows from which the pixel signals are read out.

Figure 12:
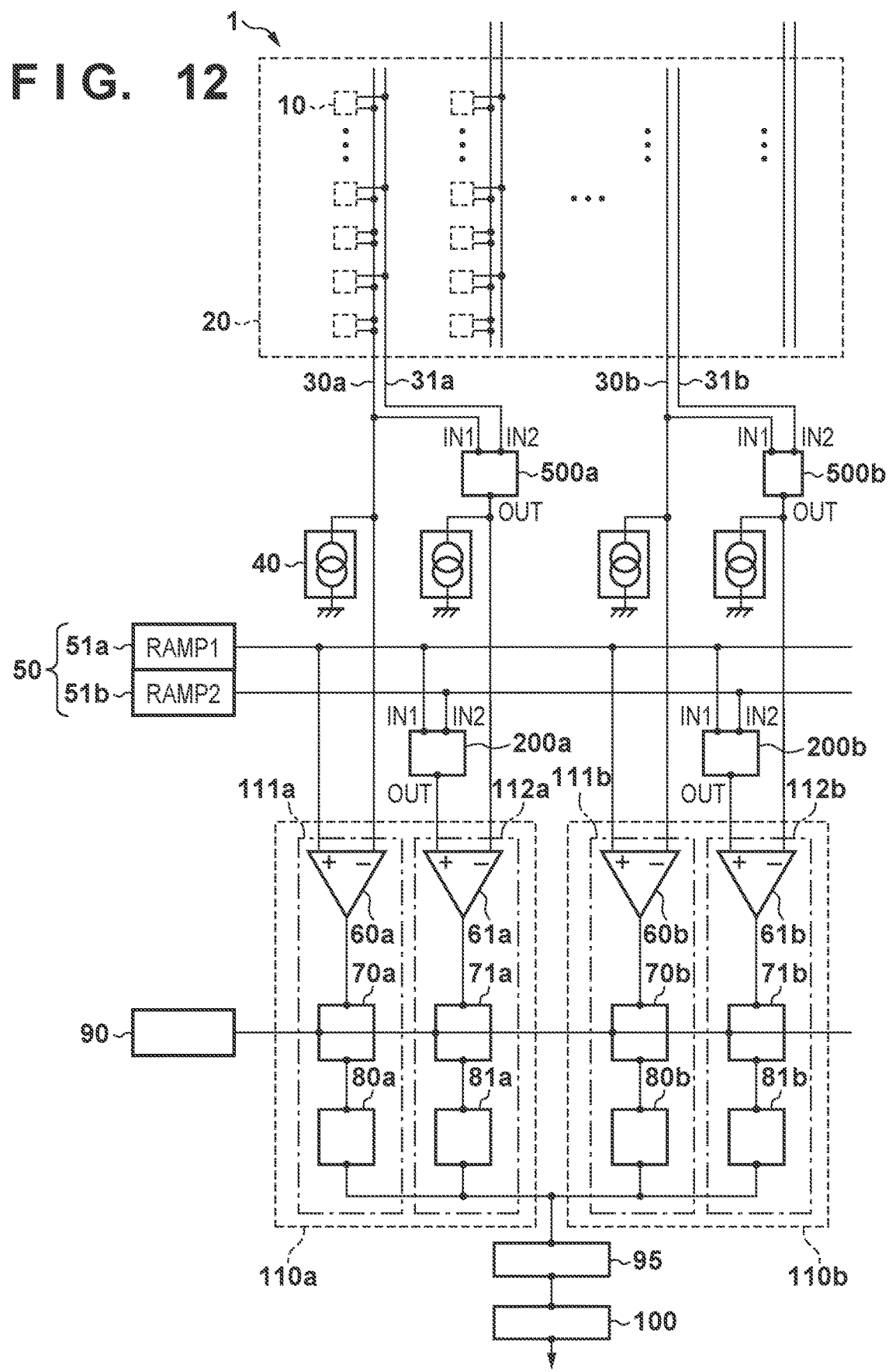
FIG. 12 is a view showing a modification of the photoelectric conversion apparatus shown in FIG. 1.

In the arrangement shown in FIG. 12, it is configured such that the column circuit 111 is connected to the signal line 30 connected to the pixels arranged in one corresponding column of the plurality of columns of the pixel array 20, and the column circuit 112 is selectively connected to the signal line 30 or the signal line 31 connected to some pixels 10 of the pixels 10 connected to the signal line 30. Thus, the photoelectric conversion apparatus 1 includes selection circuits 500 such as a plurality of multiplexers provided in correspondence with the processing circuits 110. The selection circuit 500 includes input terminals connected to the signal lines 30 and 31, respectively, and an output terminal that supplies, to the corresponding column circuit 112, the pixel signal output to the signal line 30 or the pixel signal output to the signal line 31.

It may be configured such that the column circuit 112 is connected to the signal line 30 connected to the pixels 10 arranged in one corresponding column of the plurality of columns of the pixel array 20, and the column circuit 111 is selectively connected to the signal line 30 or the signal line 31 connected to some pixels 10 of the pixels 10 connected to the signal line 30. That is, it may be configured such that one of the column circuit 111 and the column circuit 112 is connected to the signal line 30 connected to the pixels 10 arranged in one corresponding column of the plurality of columns of the pixel array 20, and the other of the column circuit 111 and the column circuit 112 is selectively connected to the signal line 30 or the signal line 31 connected to some pixels 10 of the pixels 10 connected to the signal line 30. Alternatively, it may be configured such that both the column circuit 111 and the column circuit 112 are selectively connected to the signal line 30 or the signal line 31 connected to some pixels 10 of the pixels 10 connected to the signal line 30.

Figure 13:
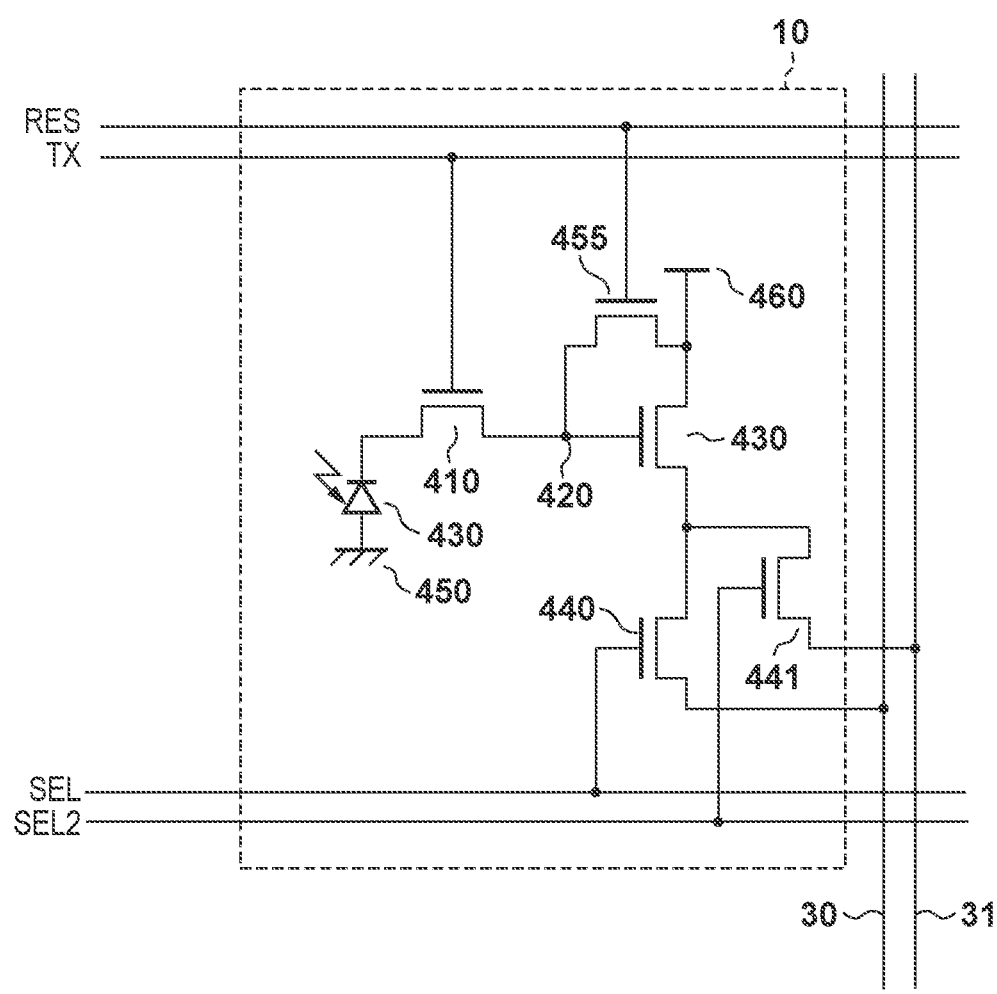
FIG. 13 is a view showing an arrangement example of a pixel of the photoelectric conversion apparatus shown in FIG. 12.

FIG. 13 shows an example of the circuit of the pixel 10 in the arrangement shown in FIG. 12. The pixel 10 further includes a selection transistor 441 as compared to the arrangement of the pixel 10 shown in FIG. 2. With this arrangement, the pixel signal can be output from the pixel 10 to both the signal lines 30 and 31. In the arrangement shown in FIG. 12, the selection transistors 440 are alternately connected to the signal line 30 and the signal line 31 by each row. On the other hand, the selection transistors 441 are connected to the signal line 30 alone in all rows. In this embodiment, when the pixel signal for one row is read out from the pixel 10 of the pixel array 20, the pixel signal is output to the signal line 30 using the selection transistor 441. When the pixel signals for two rows are read out from the pixels 10 of the pixel array 20, the pixel signals for two rows are simultaneously output to the signal lines 30 and 31 using the selection transistors 440 and 441.

When the pixel signal for one row is read out, the signal line 30 is connected to the comparator 61 using the selection circuit 500. In this case, it is possible to perform three types of readout methods similar to those described above. When the pixel signals for two rows are read out, the signal line 31 is connected to the comparator 61 using the selection circuit 500. In this case, the pixel signals of the pixels 10 in two rows can be simultaneously read out. In addition, since the selection circuit 200 is arranged, it is possible to simultaneously read out the pixel signals for two rows while using the same ramp wave RAMP1 in the comparators 60 and 61. With this, it can be suppressed that a characteristic difference such as a difference between rows is generated between the signals for two rows from which the pixel signals are simultaneously read out.

Figure 14:
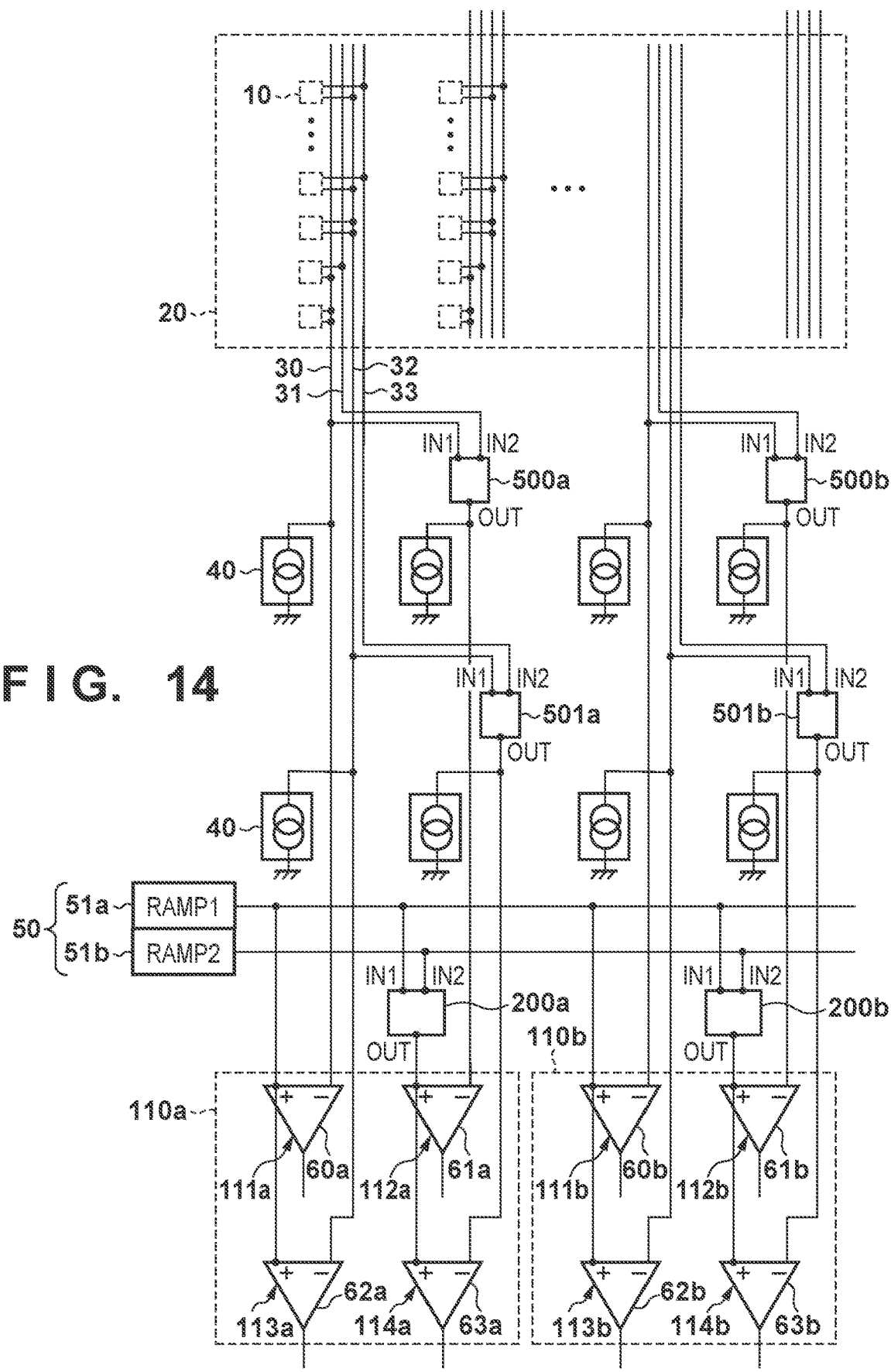
FIG. 14 is a view showing a modification of the photoelectric conversion apparatus shown in FIG. 12.

FIG. 14 shows a modification of the photoelectric conversion apparatus 1 shown in FIG. 12. Differences from the arrangement shown in FIG. 12 will be mainly described below. In the arrangement shown in FIG. 14, four signal lines 30, 31, 32, and 33 are arranged with respect to one column in which the pixels 10 are arranged. In addition, a selection circuit 501 such as a multiplexer is arranged in correspondence with each of the plurality of processing circuits 110. Each of the plurality of processing circuits 110 further includes a column circuit 113 and a column circuit 114 that process pixel signals. With this arrangement, the pixel signals for four rows can be simultaneously read out. The selection circuit 200 of the control circuit 50 is connected to the comparator 61 and a comparator 63. With this arrangement, the area of the processing circuit 110 can be reduced. In FIG. 14, parts of the column circuits 111 to 114 arranged on the processing unit 95 side of the comparators 60 to 63 are not illustrated.

In the arrangement shown in FIG. 14, it is configured such that the column circuit 111 is connected to the signal line 30 connected to the pixels arranged in one corresponding column of the plurality of columns of the pixel array 20, and the column circuit 112 is selectively connected to the signal line 30 or the signal line 31 connected to some pixels 10 of the pixels 10 connected to the signal line 30. The selection circuit 500 includes input terminals connected to the signal lines 30 and 31, respectively, and an output terminal that supplies, to the corresponding column circuit 112, the pixel signal output to the signal line 30 or the pixel signal output to the signal line 31.

It may be configured such that the column circuit 112 is connected to the signal line 30 connected to the pixels 10 arranged in one corresponding column of the plurality of columns of the pixel array 20, and the column circuit 111 is selectively connected to the signal line 30 or the signal line 31 connected to some pixels 10 of the pixels 10 connected to the signal line 30. That is, it may be configured such that one of the column circuit 111 and the column circuit 112 is connected to the signal line 30 connected to the pixels 10 arranged in one corresponding column of the plurality of columns of the pixel array 20, and the other of the column circuit 111 and the column circuit 112 is selectively connected to the signal line 30 or the signal line 31 connected to some pixels 10 of the pixels 10 connected to the signal line 30. Alternatively, it may be configured such that both the column circuit 111 and the column circuit 112 are selectively connected to the signal line 30 or the signal line 31 connected to some pixels 10 of the pixels 10 connected to the signal line 30.

Further, in the arrangement shown in FIG. 14, it is configured such that the column circuit 113 is connected to the signal line 32 connected to the pixels arranged in one corresponding column of the plurality of columns of the pixel array 20, and the column circuit 114 is selectively connected to the signal line 32 or the signal line 33 connected to some pixels 10 of the pixels 10 connected to the signal line 32. As has been described above, the selection circuit 501 is arranged in correspondence with each processing circuit 110. The selection circuit 501 includes input terminals connected to the signal lines 32 and 33, respectively, and an output terminal that supplies, to the corresponding column circuit 114, the pixel signal output to the signal line 32 or the pixel signal output to the signal line 33.

It may be configured such that the column circuit 114 is connected to the signal line 32 connected to the pixels 10 arranged in one corresponding column of the plurality of columns of the pixel array 20, and the column circuit 113 is selectively connected to the signal line 32 or the signal line 33 connected to some pixels 10 of the pixels 10 connected to the signal line 32. That is, it may be configured such that one of the column circuit 113 and the column circuit 114 is connected to the signal line 32 connected to the pixels 10 arranged in one corresponding column of the plurality of columns of the pixel array 20, and the other of the column circuit 113 and the column circuit 114 is selectively connected to the signal line 32 or the signal line 33 connected to some pixels 10 of the pixels 10 connected to the signal line 32. Alternatively, it may be configured such that both the column circuit 113 and the column circuit 114 are selectively connected to the signal line 32 or the signal line 33 connected to some pixels 10 of the pixels 10 connected to the signal line 32.

In FIG. 14, when the pixel signals for four rows are simultaneously read out, the signal line 31 is connected to the comparator 61 using the selection circuit 500, and the signal line 33 is connected to the comparator 63 using the selection circuit 501. With this, the pixel signals output from the pixels 10 to the signal lines 30 to 33 can be simultaneously read out by the comparators 60 to 63. In addition, since the selection circuit 200 is arranged, it is possible to simultaneously read out the pixel signals for four rows while using the same ramp wave RAMP1 in the comparators 60 to 63. With this, it can be suppressed that a characteristic difference such as a difference between rows is generated between the signals for four rows from which the pixel signals are simultaneously read out. Further, since the comparator 61 and the comparator 63 share the selection circuit 200, the circuit scale of the processing circuit 110, for example, the area thereof can be reduced.

The plurality of pixels 10 may include pixels for detecting different colors. For example, the plurality of pixels 10 may include pixels for detecting red light, pixels for detecting blue light, and pixels for detecting green light. In this case, the comparator 61 and the comparator 63 may be used to read out pixel signals output from the pixels 10 for the same color. Since the comparator 61 and the comparator 63 share the selection circuit 200, occurrence of crosstalk between different colors can be prevented.

The form of the photoelectric conversion apparatus 1 is not limited to the above-described embodiment. For example, the pixel 10 is not limited to the arrangement shown in FIG. 2. For example, an arrangement in which the capacitance of the node 420 can be switched may be used. Further, in the pixel 10, a plurality of the photodiodes 400 may share the node 420. The pixel 10 may have an arrangement in which the plurality of photodiodes 400 are arranged below one microlens and a phase difference can be detected. Each of the comparators 60 to 63 may include a capacitance for an auto zero operation, a switch, and the like.

Figure 15:
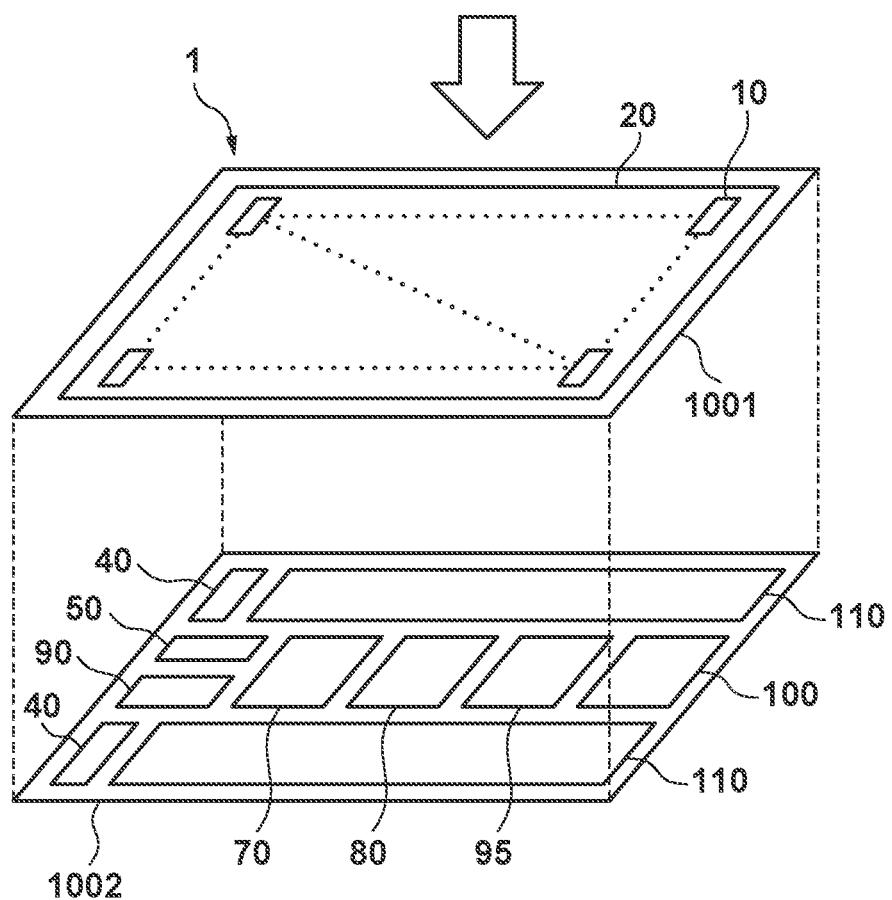
FIG. 15 is a view showing an arrangement example of the photoelectric conversion apparatus shown in FIG. 1.

For example, as shown in FIG. 15, the photoelectric conversion apparatus 1 may include a substrate 1001 and a substrate 1002 which are at least partially stacked on each other. In this case, the pixel array 20 including the plurality of pixels 10 may be arranged in the substrate 1001, and the plurality of processing circuits 110 may be arranged in the substrate 1002. The control circuit 50 may be arranged in the substrate 1002. When the substrate 1001 and the substrate 1002 are stacked, as indicated by an arrow in FIG. 15, light can enter from the substrate 1001 side. By using the stacked arrangement of the substrate 1001 and the substrate 1002, for example, it is possible to suppress that the wiring length between the pixel 10 and the corresponding processing circuit 110 becomes long, so that the parasitic capacitance of the wiring pattern can be reduced. Accordingly, the processing capability of the photoelectric conversion apparatus 1 can be improved. In addition, by using the stacked arrangement of the substrate 1001 and the substrate 1002, for example, the chip area of the photoelectric conversion apparatus 1 can be suppressed. Further, the photoelectric conversion apparatus 1 may include three or more substrates. In this case, for example, the components such as the processing unit 95 and the output circuit 100 may be arranged in the substrate different from the substrates 1001 and 1002.

The form of performing A/D conversion using ramp waves, a so-called slope A/D conversion, has been described above, but the present invention is also applicable to another A/D conversion format. For example, the present invention is applicable to successive-approximation A/D conversion. In this case, each of the generation circuits 51a and 51b may output a reference signal instead of the ramp wave. In this case, a potential difference (offset) may be set between the reference signal output by the generation circuit 51a and the reference signal output by the generation circuit 51b. Each column circuit 111 includes a capacitive element group to which the reference signal is input, and the signals output from the capacitive element group are input to the comparators 60 and 61 instead of the ramp waves. With this arrangement, a successive-approximation A/D conversion operation can be performed.

Further, in this embodiment, the form of outputting the plurality of ramp waves using the plurality of generation circuits has been described, but one generation circuit may generate the plurality of ramp waves. As this form, for example, the slope may be changed between the ramp wave RAMP1 and the ramp wave RAMP2 by changing the capacitance value between the wiring pattern which transmits the ramp wave RAMP1 and the wiring pattern which transmits the ramp wave RAMP2. As a method of changing the capacitance value, for example, a capacitive element is connected to one of the wiring pattern which transmits the ramp wave RAMP1 and the wiring pattern which transmits the ramp wave RAMP2. No capacitive element is connected to the other of the wiring patterns.

Figure 16:
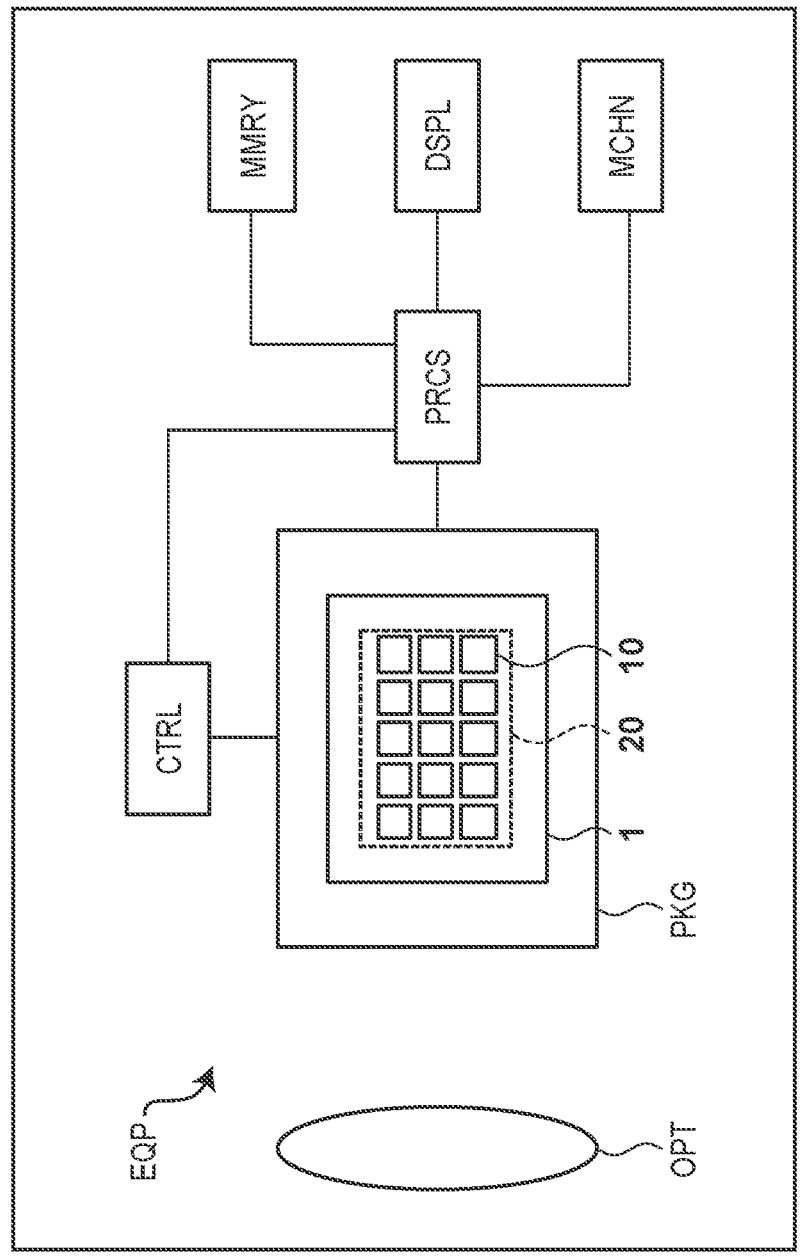
FIG. 16 is a view showing an arrangement example of an equipment incorporating the photoelectric conversion apparatus according to the embodiment.

An application example of the photoelectric conversion apparatus 1 according to the embodiment described above will be described below. FIG. 16 is a schematic view of an electronic equipment EQP incorporating the photoelectric conversion apparatus 1. The equipment EQP can also be called an electronic equipment. FIG. 16 shows a camera as an example of the electronic equipment EQP. The concept of a camera here not only includes an apparatus whose main object is image capturing, but also an apparatus (for example, a personal computer or a mobile terminal such as a smartphone) that has an image capturing function auxiliary.

The photoelectric conversion apparatus 1 can be a semiconductor chip with a stacked structure including the pixel array 20. As shown in FIG. 16, the photoelectric conversion apparatus 1 is contained in a semiconductor package PKG. The semiconductor package PKG can include a base to which the photoelectric conversion apparatus 1 is fixed, a lid such as glass facing the photoelectric conversion apparatus 1, and a conductive connecting member such as a bonding wire or bump used to connect the terminal arranged in the base to a terminal arranged in the photoelectric conversion apparatus 1. The equipment EQP may further include at least one of an optical system OPT, a control device CTRL, a processing device PRCS, a display device DSPL, and a storage device MMRY.

The optical system OPT is a system for forming an image on the photoelectric conversion apparatus 1, and can be, for example, a lens, a shutter, and a mirror. The control device CTRL is a device for controlling the operation of the photoelectric conversion apparatus 1, and can be, for example, a semiconductor device such as an ASIC or the like. The processing device PRCS functions as a signal processing unit that processes the signal output from the photoelectric conversion apparatus 1, and can be, for example, a semiconductor device such as a CPU, an ASIC, or the like. The display device DSPL can be an EL display device or a liquid crystal display device that displays image data obtained by the photoelectric conversion apparatus 1. The storage device MMRY is a magnetic device or a semiconductor device for storing the image data obtained by the photoelectric conversion apparatus 1. The storage device MMRY can be a volatile memory such as an SRAM, a DRAM, or the like or a nonvolatile memory such as a flash memory or a hard disk drive. A mechanical device MCHN includes a moving or propulsion unit such as a motor or an engine. The mechanical device MCHN in the camera can drive the components of the optical system OPT for zooming, focusing, and shutter operations. In the equipment EQP, image data output from the photoelectric conversion apparatus 1 is displayed on the display device DSPL, or transmitted to an external device by a communication device (not shown) included in the equipment EQP. Hence, the equipment EQP may also include the storage device MMRY and the processing device PRCS.

The camera incorporating the photoelectric conversion apparatus 1 is also applicable as a surveillance camera or an onboard camera mounted in a transportation equipment such as an automobile, a railroad car, a ship, an airplane, or an industrial robot. In addition, the camera incorporating the photoelectric conversion apparatus 1 is not limited to a transportation equipment but is also applicable to an equipment that widely uses object recognition, such as an intelligent transportation system (ITS).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-197870, filed Dec. 6, 2021, which is hereby incorporated by reference herein in its entirety.

What is claimed is:
1. A photoelectric conversion apparatus comprising:
a plurality of pixels arranged so as to form a plurality of rows and a plurality of columns;
a plurality of processing circuits; and
a control circuit configured to control the plurality of processing circuits,
wherein each of the plurality of processing circuits comprises a first column circuit and a second column circuit, each of which performs A/D conversion of converting, into a digital signal, a pixel signal output from the pixel arranged in a corresponding column of the plurality of columns,
wherein the control circuit comprises a generation circuit configured to generate a first signal used in the A/D conversion, and a second signal different from the first signal and used in the A/D conversion,
wherein the apparatus further comprises a selection circuit configured to receive the first signal and the second signal, and to select and supply one of the first signal and the second signal to the second column circuit in a period in which the first signal is supplied to the first column circuit,
wherein the first column circuit converts one pixel signal into a digital signal using the first signal, and wherein the second column circuit converts the one pixel signal used in the first column circuit into a digital signal using the first signal or the second signal selected by the selection circuit.

2. The apparatus according to claim 1, wherein the selection circuit is each of a plurality of multiplexers provided so as to correspond to each of the plurality of processing circuits, and
wherein each of the plurality of multiplexers comprises input terminals configured to receive the first signal and the second signal, respectively, and an output terminal configured to supply one of the first signal and the second signal to the corresponding second column circuit.

3. The apparatus according to claim 1, wherein the control circuit comprises a multiplexer as the selection circuit, and
wherein the multiplexer comprises input terminals configured to receive the first signal and the second signal, respectively, and an output terminal configured to supply one of the first signal and the second signal to a plurality of the second column circuits each arranged in each of the plurality of processing circuits.

4. The apparatus according to claim 1, further comprising another selection circuit, which is different from the selection circuit, configured to receive the first signal and the second signal, and to select and supply one of the first signal and the second signal to the first column circuit.

5. The apparatus according to claim 4, wherein the another selection circuit is each of a plurality of multiplexers provided so as to correspond to each of the plurality of processing circuits, each multiplexer including input terminals configured to receive the first signal and the second signal, respectively, and an output terminal configured to supply one of the first signal and the second signal to the corresponding first column circuit.

6. The apparatus according to claim 1, wherein the generation circuit comprises a first generation circuit configured to generate the first signal, and a second generation circuit configured to generate the second signal.

7. The apparatus according to claim 6, wherein the control circuit further comprises a switch element configured to short-circuit an output of the first generation circuit and an output of the second generation circuit.

8. The apparatus according to claim 6, wherein the first signal and the second signal are ramp waves having slopes different from each other, and
wherein each of the first column circuit and the second column circuit comprises a comparator configured to compare the pixel signal and the ramp wave.

9. The apparatus according to claim 1, wherein each of the first column circuit and the second column circuit comprises a variable gain amplifier, and
wherein the variable gain amplifier of the first column circuit and the variable gain amplifier of the second column circuit are configured to amplify the pixel signal by amplification factors different from each other in accordance with the first signal and the second signal.

10. The apparatus according to claim 1, wherein the first column circuit and the second column circuit are connected in parallel to a signal line connected to pixels arranged in one corresponding column of the plurality of columns.

11. The apparatus according to claim 1, wherein one of the first column circuit and the second column circuit is connected to a first signal line connected to pixels arranged in one corresponding column of the plurality of columns, and
wherein the other of the first column circuit and the second column circuit is selectively connected to one of the first signal line and the second signal line connected to some pixels of the pixels connected to the first signal line.

12. The apparatus according to claim 1, wherein each of the plurality of processing circuits further comprises a third column circuit and a fourth column circuit, each of which performs A/D conversion of converting the pixel signal into a digital signal,
wherein in a period in which the first signal is supplied to the third column circuit, the selection circuit selects and supplies one of the first signal and the second signal to the fourth column circuit,
wherein one of the first column circuit and the second column circuit is connected to a first signal line connected to pixels arranged in one corresponding column of the plurality of columns,
wherein the other of the first column circuit and the second column circuit is selectively connected to one of the first signal line and a second signal line connected to some pixels of the pixels connected to the first signal line,
wherein one of the third column circuit and the fourth column circuit is connected to a third signal line connected to the same pixels as the pixels connected to the first signal line, and
wherein the other of the third column circuit and the fourth column circuit is selectively connected to one of the third signal line and a fourth signal line connected to some pixels of the pixels connected to the third signal line.

13. The apparatus according to claim 1, further comprising a first substrate and a second substrate at least partially stacked on each other,
wherein the plurality of pixels are arranged in the first substrate, and
wherein the plurality of processing circuits are arranged in the second substrate.

14. The apparatus according to claim 13, wherein the control circuit is arranged in the second substrate.

15. An equipment comprising:
the photoelectric conversion apparatus according to claim 1; and
a signal processor configured to process a signal output from the photoelectric conversion apparatus.

16. The apparatus according to claim 1, wherein the first column circuit and the second column circuit convert the one pixel signal in parallel.

* * * * *